United States Patent [19]

Nakajima

[11] 3,810,037

[45] May 7, 1974

[54] TRAVELING-WAVE TYPE POWER ADDITION CIRCUIT

[75] Inventor: Masamitsu Nakajima, Kyoto, Japan

[73] Assignee: Kyoto University, Kyoto, Japan

[22] Filed: June 15, 1972

[21] Appl. No.: 263,240

[30] Foreign Application Priority Data

Sept. 13, 1971 Japan .............................. 46-071003

[52] U.S. Cl. .................... 331/55, 331/56, 333/24 R
[51] Int. Cl. .............................................. H03b 3/06
[58] Field of Search ..... 331/55, 56; 333/24.2, 24 R, 333/10

[56] References Cited

UNITED STATES PATENTS

| | | | |
|---|---|---|---|
| 2,803,750 | 8/1957 | Dayem | 331/55 |
| 3,633,123 | 1/1972 | Marcatili | 331/55 |

OTHER PUBLICATIONS

R. C. Mackey, Ire Trans., July, 1962, Page 229.

*Primary Examiner*—Herman Karl Saalbach
*Assistant Examiner*—Siegfried Grimm
*Attorney, Agent, or Firm*—Oblon, Fisher, Spivak, McClelland & Maier

[57] ABSTRACT

A traveling-wave type power addition circuit has an original oscillator and a separate directional coupler, reflector and phase shifter associated with each additional oscillator such that a wave provided by the original oscillator is supplied to a subsequent directional coupler and a part of the wave is supplied to a subsequent reflector. Any reflected wave from the reflector is injected through the phase shifter to the additional oscillator. The synchronized output is passed through the directional coupler to a main line.

5 Claims, 1 Drawing Figure

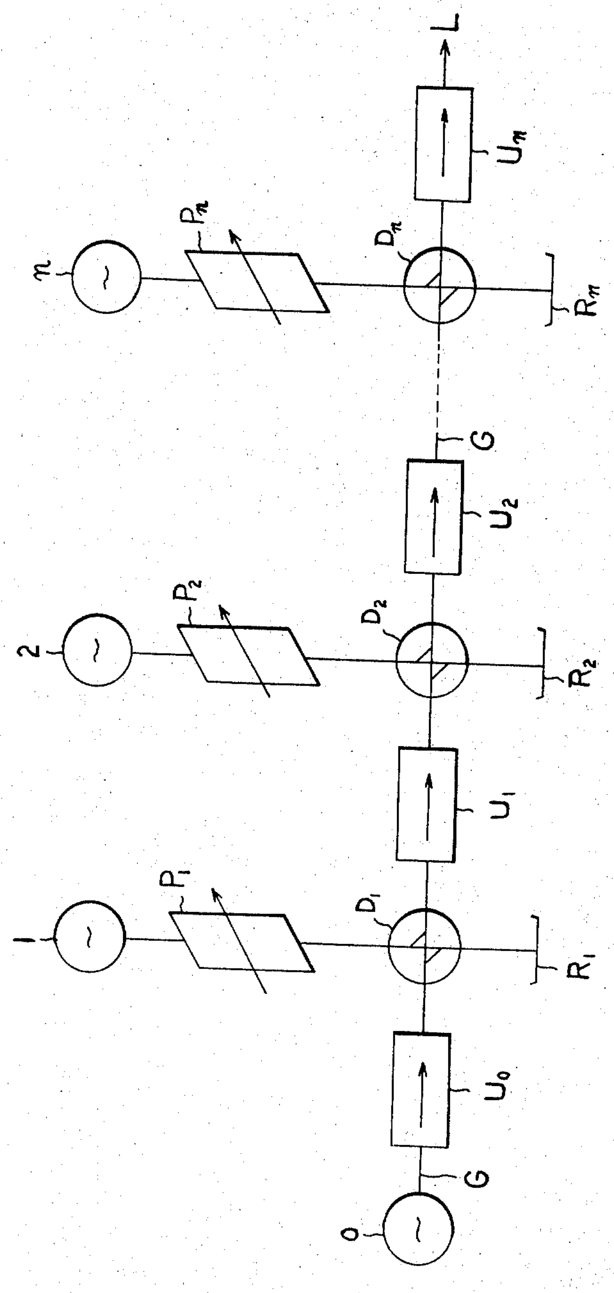
L
$U_n$
$P_n$
$D_n$
$R_n$
G
$U_2$
$P_2$
$D_2$
$R_2$
$U_1$
$P_1$
$D_1$
$R_1$
$U_0$
G
0
1
2
n

TRAVELING-WAVE TYPE POWER ADDITION CIRCUIT

BACKGROUND OF THE INVENTION

1. Field of the Invention

This invention generally relates to a traveling-wave type power addition circuit and more particularly to a microwave power combiner of a traveling-wave configuration which utilizes directional couplers and the synchronization phenomena of oscillators.

2. Description of the Prior Art

Recently, certain semiconductor type microwave oscillators have been developed. However, since the output power output of the conventional semiconductor type oscillator was low, a power combination was often required.

The conventional methods for power combination have been classified into the following three categories as stated in the Journal of the Institute of Electronics and Communication Engineers of Japan Vol. 54, No. 5, Pages 693 – 699, published May 1971, entitled "The Synchronization Phenomena of Microwave Solid-State Oscillators and its Application" by J. Ikegami and M. Nakajima.

1. To fabricate one compound diode by connecting many elements in parallel in one capsule;

2. To load several elements by means of transmission lines; and

3. To combine several pairs of (oscillation) powers by means of Magic T's or 3 db couplers.

While somewhat satisfactory, the above conventional methods were found to have certain disadvantages which limited the characteristics of the oscillators and restricted the number of the oscillators which could be coupled.

Initially, it should be understood that the output power of a semiconductor oscillating element is limited because of the heating of the element. Moreover, the amount of heat with which the semiconductor oscillating element can withstand is related to the size thereof. However, the size of the element is limited, because of the necessity of heat sink as well as the short wave length of the microwave and the millimeter-waves.

The method of power combination according to number (1) above is the most fundamental in that the semiconductor elements are mechanically separated and then electrically coupled. The method (1) is also the most practical of the three conventional methods, however it has limitations because of the contradictory requirement that the distance among the elements be long to secure a good heat sink, yet the distance should be short to enable effective electric coupling. It should further be noted that the method (1) relates to the preparation of the semiconductor oscillating elements rather than to the power combining circuit, and that the number of semiconductor oscillating elements can not be increased indefinitely because of the lumped nature of this method.

The method according to number (2) above appears to be a simple and effective method of increasing the output power, however, the efficiency of the power combination was somewhat reduced because of mismatching between the load and the negative resistances of the oscillators as the humber of oscillators combined was increased. Moreover, as is well known, this kind of multi-element oscillator had the same number of oscillation modes as the number of semiconductor oscillating elements. Accordingly, method (2) again failed to provide a desirous form of oscillation for obtaining a complete power combination.

The method according to number (3) was found to provide an almost 100 percent of efficiency of power combination, when the circuit was symmetrically adjusted in the best condition. However, the method (3) had disadvantages in that the structure occupied a large space and was complicated because of the use of magic T's or 3 db couplers. Moreover, it was difficult to combine many semiconductor oscillating elements. Additonally, even though many semiconductor oscillating elements were combined, only a power combination for $2^n$ pieces of elements having the same characteristics could be provided (wherein $n$ represents an integer).

SUMMARY OF THE INVENTION

It is an object of this invention to provide a new and improved unique traveling-wave type power addition circuit which provides high power addition without restricting the number of oscillator elements that can be used for the power addition.

It is another object of this invention to provide a new and improved unique traveling-wave type power addition circuit wherein a desirable number of oscillators can be easily added or deleted.

It is yet another object of this invention to provide a new and improved unique traveling-wave type power addition circuit having high reliability and wherein a defect in some of the oscillators thereof will not greatly affect the total amount of output power.

It is yet still another object of this invention to provide a new and improved unique traveling-wave type power addition circuit, wherein powers of different magnitude can be combined by selecting a proper coupling for each corresponding directional coupler.

It is one other object of this invention to provide a new and improved unique traveling-wave type power addition circuit, wherein, when the output of the original oscillator is frequency-modulated by an FM signal, the other oscillators are automatically frequency-modulated.

It is one further object of this invention to provide a new and improved unique traveling-wave type power addition circuit, wherein the FM noise of the oscillators are decreased, by feeding back a part of the output power through a delay line in place of that of the original oscillator..

The foregoing and other objects are, in one aspect, attained in accordance with this invention by the provision of a traveling-wave type power addition circuit which is formed by using directional couplers.

BRIEF DESCRIPTION OF THE DRAWINGS

These and other objects, and features of this invention will be more readily appreciated from the following detailed description when considered in connection with the accompanying drawing wherein the solitary FIGURE is a schematic diagram of a traveling-wave type power addition circuit according to this invention and wherein 0, 1, 2 . . . $n$ each respectively represent an oscillator; G represents a main transmission line; $U_o$ . . . $U_n$ each respectively represent an isolator; $P_1$ . . . $P_n$ each respectively represent a phase shifter; $D_1$ . . . $D_n$ each respectively represent a directional coupler; $R_1$ . . . $R_n$ each respectively represent a reflector; and L represents an output terminal.

DETAILED DESCRIPTION OF THE PREFERRED EMBODIMENTS

Referring now to the drawing the traveling-wave type oscillator of the present invention is shown as having each power output of the oscillators 1, . . . *n* passed through a corresponding phase shifter $P_1$, $P_2$ . . . $P_n$ and then through each corresponding directional coupler $D_1$ . . . $D_n$ to the main transmission line G, which may be a waveguide. The combined power is then provided at the output load terminal L.

Now for example, when the two oscillators 0 and 1 are used, the wave provided from the original or first oscillator 0 is passed through the isolator $U_o$ in the main transmission line G to the load L. A part of the wave which passes through the isolator $U_o$, is passed through the directional coupler $D_1$ to the reflector $R_1$. The resulting reflected wave is then injected through the phase shifter $P_1$ to the second additional oscillator 1.

The oscillator 1 is synchronized to the original oscillator 0 by the injected wave, whereby the synchronized output wave of the oscillator 1 is passed through the phase shifter $P_1$ and is added to the power of the main transmission line G of the waveguide by the direction coupler $D_1$.

When the coupling constant of the directional coupler $D_1$ is selected equal to the ratio of the output powers of the two oscillators and the phase-angle of the phase shifter $P_1$ or the reflector $R_1$ is properly adjusted, then the power waves of both of the oscillators 0 and 1 will be completely combined in the same phase.

More particularly, it should be understood that the wave from the oscillator 1 which is reflected by the reflector $R_1$ will be added, in opposite phase, to the reflected wave from the original oscillator 0, whereby any feedback waves to the oscillators 1 and 0 will cancel each other. Accordingly, both of the oscillators 0 and 1 will be operated in a complete matched state.

Additionally, it should be understood that when the reflected wave is completely cancelled that the wave injected into the oscillator 1 will cease to exist. If the oscillators depart from synchronism on account of the complete cancellation, there will again appear a reflected wave in accordance with the shift from synchronism, and thus the shift from synchronism will automatically be compensated for in the direction of synchronism.

When the combined oscillator system 0 and 1 is deemed as the original oscillator and the above-mentioned theoretical consideration is applied for the additional oscillators 2, . . . n, it will easily be understood that the power addition of a desirous number of oscillators can be provided in accordance with this invention.

In the above described embodiment isolators $U_o$ . . . $U_n$ are employed. However, a similar power addition effect can be provided without isolators. However, when the isolators $U_o$ . . . $U_n$ are used, the phase adjustment for either the phase shifters $P_1$ . . . $P_n$ or the reflectors $R_1$ . . . $R_n$ can be omitted. But, when the isolators are not used, both of the phase adjustments for $P_1$ . . . $P_n$ and $R_1$ . . . $R_n$ are necessary.

One particular embodiment of the traveling-wave type power addition circuit of this invention can be illustrated by referring to the sole FIGURE, wherein the main transmission line G comprises a rectangular waveguide having an inner size of 22.9 × 10.2 mm and operating at 10 $GH_z$ (X-Band) (Japan Ind. Standard WRJ-10). The isolator $U_o$ was of the static deflection type having a width for a working frequency band of 8.2 – 12.4 $GH_z$. The directional coupler $D_1$ had a width for a working frequency band of 8.6 – 9.6$GH_z$ with a 6 db degree of coupling, and a 27 db minimum of directionality. The short-plunger $R_1$ (Reflector) had 0 – 25 mm of the moving range (corresponding to $\psi_1 = 0 - 2\pi$), the variable phase shifter $P_1$ had a width for a working frequency band of 9.1–9.6 $GH_z$, and $\theta = 0 - \pi$ of the variable range of the phase shift which could be deleted when the isolator $U_o$ was used. The two oscillators were both Klystron 2K25's which had an oscillation frequency of 9.31 $GH_z$ and each oscillator respectively had 52.2 mW and 17.5mW for an output power.

In accordance with the operation of the power addition circuit, 68.0 mW of combined output power or an efficiency of power combination of 97 percent was obtained when the coupling phase angle of the oscillator was about $104_1 - 2\theta \approx \pi$. If the circuit loss is not considered, the efficiency of power combination should be 100 percent.

It should be apparent that the traveling-wave type power addition circuit of this invention has the following advantageous characteristics.

a. There is no restriction on the number of the oscillators that can be used for the power addition, so that a desirously large power output can be provided by combining many oscillators;

b. It is possible to easily supplement or attach an additional number of oscillators, if necessary, as can be understood from the above description.

c. Although the prior art conventional method number (3) required the use of pairs of oscillators having the same characteristics, the power addition circuit of this invention can combine oscillators having different power characteristics.

d. Although the prior art conventional method number (3) required magic T's and the like which were relatively large-sized couplers that had to be completely adjusted and matched, the power addition circuit of this invention is advantageosus in economical terms and in spatial configuration, because the directional couplers used are of a smaller size and a simpler structure.

e. As the number of the oscillators increases the couplings of the directional couplers for the later stages becomes small. Therefore, the power addition circuit of this invention is advantageous especially for combining a large number of oscillators.

f. In practice each reflector is realized by a transmission line of a proper length, short circuited at one end, and each phase shifter is realized by a transmission line of a proper length. Consequently, the power addition circuit of this invention can be assembled utilizing MIC technology.

g. When only the original oscillator is frequency-modulated, the power addition circuit of this invention can act as an injection locked FM amplifier, which may be substituted for the conventional traveling-wave tube amplifier.

h. When a part of the output power is supplied to a delay line or a cavity resonator and is injected by feedback, instead of the original oscillator 0, the FM noise of the oscillator is decreased.

i. The reliability of the power addition circuit of this invention is high, because many oscillators are used and when one of the oscillators becomes inoperative the effect is small.

Thus, it should now be apparent that with the present invention, a traveling-wave type power addition circuit is provided which results in a more advantageous microwave power combiner which will enable a high microwave power from solid-state oscillators to be realized.

Moreover, if a standard signal generator with a high spectral purity is employed for the oscillator 0, the FM noise and the frequency stability of the output power is improved. This device can be utilized in order to enhance the power of some microwave transmission systems by inserting an arbitrary section of the same between the source and the load.

Obviously, numerous modifications and variations of the present invention are possible in light of the above teachings. It is therefore understood that within the scope of the appended claims the invention may be practiced otherwise than as specifically described herein. Accordingly,

What is claimed as new and desired to be secured by letters patent of the United States is:

1. A microwave traveling-wave type power addition circuit, which comprises:

a main solid-state microwave oscillator;

a main transmission line for receiving the output of said main oscillator and for transmitting it to a load; and a power combination circuit which comprises an additive solid-state microwave oscillator having output power characteristics different from those of said main oscillator, directional coupling means disposed along said main transmission line between said main oscillator and said load for receiving output signals from said main oscillator and said additive oscillator, reflecting means connected to said directional coupling means for receiving part of said output signal from said main oscillator and reflecting it back through said directional coupling means to said additive oscillator, phase shifting means connected between said directional coupling means and said additive oscillator for adjusting the phase of the signals passing therethrough, and isolator means positioned between said main oscillator and said directional coupling means for preventing a feedback signal from said additive oscillator from reaching said main oscillator and for allowing the omission of the phase adjustment between either said additive oscillator or said reflecting means and said directional coupling means, the power output of said additive oscillator signal being combined in phase with the power output of said main oscillator signal, said combined signal passing through said directional coupling means towards said load.

2. The microwave traveling-wave type power addition circuit according to claim 1 further comprising a plurality of said power combination circuits, each of which receives its input at its isolator means, said input signal comprising said combined signal from the directional coupler of the immediately preceding combination circuit, whereby the total power output of said circuit delivered to said load is substantially equal to the sum of the power outputs of said main oscillator and said plurality of additive oscillators.

3. The microwave traveling-wave type power addition circuit according to claim 2 wherein each of said plurality of reflecting means comprises a transmission line having a predetermined length that is short circuited at one end thereof.

4. The microwave traveling-wave type power addition circuit according to claim 3 wherein each of said plurality of phase shifting means comprises a transmission line whose length is selected to yield the desired phase shift.

5. The microwave traveling-wave type power addition circuit according to claim 4 wherein the output from said plurality of additive oscillators is automatically frequency-modulated by an FM signal from said main oscillator.

* * * * *